(12) United States Patent
Huang

(10) Patent No.: US 6,923,560 B2
(45) Date of Patent: Aug. 2, 2005

(54) MOUNTING BASE FOR A WARNING LIGHT

(76) Inventor: Chun-Ming Huang, 10f-1, No. 3, Paoshan 3rd St., Taichung (TW)

( * ) Notice: Subject to any disclaimer, the term of this patent is extended or adjusted under 35 U.S.C. 154(b) by 160 days.

(21) Appl. No.: 10/417,053

(22) Filed: Apr. 16, 2003

(65) Prior Publication Data

US 2004/0208014 A1 Oct. 21, 2004

(51) Int. Cl.⁷ .................................................. B60Q 1/00
(52) U.S. Cl. .................. 362/486; 362/540; 362/267
(58) Field of Search ................................ 362/486, 493, 362/540, 542, 267

(56) References Cited

U.S. PATENT DOCUMENTS

| | | | | |
|---|---|---|---|---|
| 2,905,925 A | * | 9/1959 | Whiteneck ................. 362/486 |
| 5,034,860 A | * | 7/1991 | Bryant et al. ............... 362/493 |
| 5,041,950 A | * | 8/1991 | Tyson .......................... 362/96 |
| 5,060,121 A | * | 10/1991 | Cunningham et al. ...... 362/548 |
| 5,521,806 A | * | 5/1996 | Hutzel et al. ............... 362/486 |

* cited by examiner

Primary Examiner—Y. My Quach-Lee
Assistant Examiner—Peggy A. Neils
(74) Attorney, Agent, or Firm—Jackson Walker, LLP

(57) ABSTRACT

A mounting base for receiving a light assembly of a warning light has a recess and a body with a top. The recess has an inner cavity, a sidewall and a wire guide device and is defined in the top of the body. The light assembly is mounted in the recess and has wires to connect to an electricity supply. The wire guide device has a plug and a notch is defined through the sidewall. The plug having wire through holes is firmly fitted in the notch and allows the wires to pass through the wire through holes to extend outward from the warning light. The plug will hold and waterproof components of the light assembly in the recess of the mounting base.

7 Claims, 5 Drawing Sheets

MOUNTING BASE FOR A WARNING LIGHT

BACKGROUND OF THE INVENTION

1. Field of the Invention

The present invention relates to a mounting base for a warning light, and more particularly to a mounting base for a warning light has a wire guide device that allows wires to pass through and extend out of the mounting base.

2. Description of Related Art

Warning lights are used to mount on vehicles or install on a stand that is located in a dark place to produce a visible warning signal by light to alert people of a hazard. Especially, in the dark place or at night, the warning lights will definitely alert people that there is a dangerous state. Since the warning lights are usually located outside and have an electrical lighting apparatus within to produce the light, it is important for the warning light to be waterproof.

Furthermore, the electrical lighting apparatus of a warning light certainly consists of many active or passive electrical elements, such as resistors, capacitors, inductors, diodes etc. therein. Each of the electronic elements has leads used to electrically connect all the electronic elements together on a circuit board to perform a given function. However, because the warning light might be installed on a vehicle, vibrations and shocks caused by the vehicle moving will be transmitted to the electronic elements. The vibrations will vibrate the leads of the electronic elements and this may cause damage to the electronic elements.

With reference to FIG. 4, a conventional warning light (not numbered) has a mounting base (60), a removable casing (70), a light assembly (80) and an O-ring (90). The mounting base (60) has a body (not numbered) and a recess (61). The body has a top (not numbered) and a bottom (not numbered). The recess (61) is defined in the top of the body of the mounting base (60) and has a sidewall (611), an inner cavity (not numbered), an open top (not numbered) and a bottom (not numbered). The removable casing (70) is attached to the top of the body of the mounting base (60) by means of a thread with the O-ring (90) that provides a waterproof feature, and has an inner chamber (not numbered) corresponding to the inner cavity of the recess (61).

The light assembly (80) is mounted on the bottom of the recess (61) and has a light unit (81), a power control device (82) and wires (83). The light unit (81) is electrically connected to the power control device (82) that is mounted on the bottom in the inner cavity of the recess (61). The light unit (81) extends out of the recess (61) and is received in the inner chamber of the removable casing (70) to produce blinking lights for visible warning signals.

The wires (83) electrically connect the power control device (82) to an outside electricity supply that provides the power control device (82) power. The wires (83) must extend out of the recess (61) to electrically connect to the electricity supply outside the mounting base (60). To achieve this purpose, the recess (61) further has an opening (612) defined through the sidewall (611) of the recess (61) to allow the wires (83) to extend out of the recess (61). However, in such a configuration, the wires (83) might be pulled out inadvertently and disconnect to the power control device (82). Besides, moisture will enter the inner cavity of the recess (61) through the opening (612) and will impair normal working of the light assembly (80).

In order to overcome the foregoing problem and minimize the vibration effects, one method is to inversely locate the power control device (82) so the electronic components will be suspended. Thereafter, a layer of substance is solidified around the electronic components or elements to securely hold the leads of the electronic elements and prevent water damaging the electrical lighting apparatus.

With reference to FIG. 5, to achieve complete waterproofing of the warning light and protect the leads of the electronic elements from vibration effects, the light unit (81) and the power control device (82) are rearranged. The inner cavity of the recess (61) is filled up with a layer of solidifying substance (62) to encase the power control device (82). The solidifying substance (62) is firstly poured into the recess (61) and will finally become solid. The solidifying substance (62) will caulk the opening (612) to keep the water out and firmly hold the leads of the electronic elements. When the solidifying substance (62) becomes solid, the vibration effects to the leads of the electronic elements will be minimized. Also, the solidifying substance (62) caulks the opening (612) that allows the wires (83) to extend out of the recess (61) and cooperates with the O-ring (90) clamped between the mounting base (60) and the removable casing (70), whereby the warning light will be waterproof. Thereafter, moisture, water or dust will not enter into the recess (61), and the solidifying substance (62) will prevent the warning light away from vibration effects.

However, since the opening (612) is defined in the sidewall (611) of the recess (61), the solidifying substance (62) must fill over the opening (612) to totally caulk the opening (612) to keep the water out and this means a significant amount of the solidifying substance (62) is needed.

Furthermore, the solidifying substance (62) needs time to become solid. Before the solidifying substance (62) becomes solid, the solidifying substance (62) will flow out of the recess (61) from the opening (612). Both of foregoing states incur costs that render the process too expensive. The present invention provides an improved mounting base for a warning light to mitigate or obviate the aforementioned problems.

SUMMARY OF THE INVENTION

The main objective of the invention is to provide a mounting base for a warning light that has a wire guide device that reduces a quantity of solidifying substance used in caulking and fixing electronic elements of the warning light.

To achieve this object, the wire guide device comprises a plug and a notch and is mounted in a warning light. The warning light has a mounting base, a light assembly and a removable casing. The mounting base has a body and a recess with a sidewall and an inner cavity. The light assembly is mounted in the inner cavity of the recess and is housed by the removable casing. The notch is defined through the sidewall of the recess and has an open top, two opposite side edges and two slots. The slots are respectively defined from the open top at the side edges of the notch. The plug is inserted and held in the notch and has wire through holes and two protrusions corresponding to the two slots of the notch. The plug is securely held in the notch with the protrusions respectively fitted in the slots. Wires of the light assembly extend through the wire through holes in the plug and out of the recess to connect to an electricity supply. Therefore, the wire guide will require only a small quantity of a solidifying substance.

Other objectives, advantages and novel features of the invention will become more apparent from the following detailed description when taken in conjunction with the accompanying drawings.

DETAILED DESCRIPTION OF PREFERRED EMBODIMENT

Figure 1:
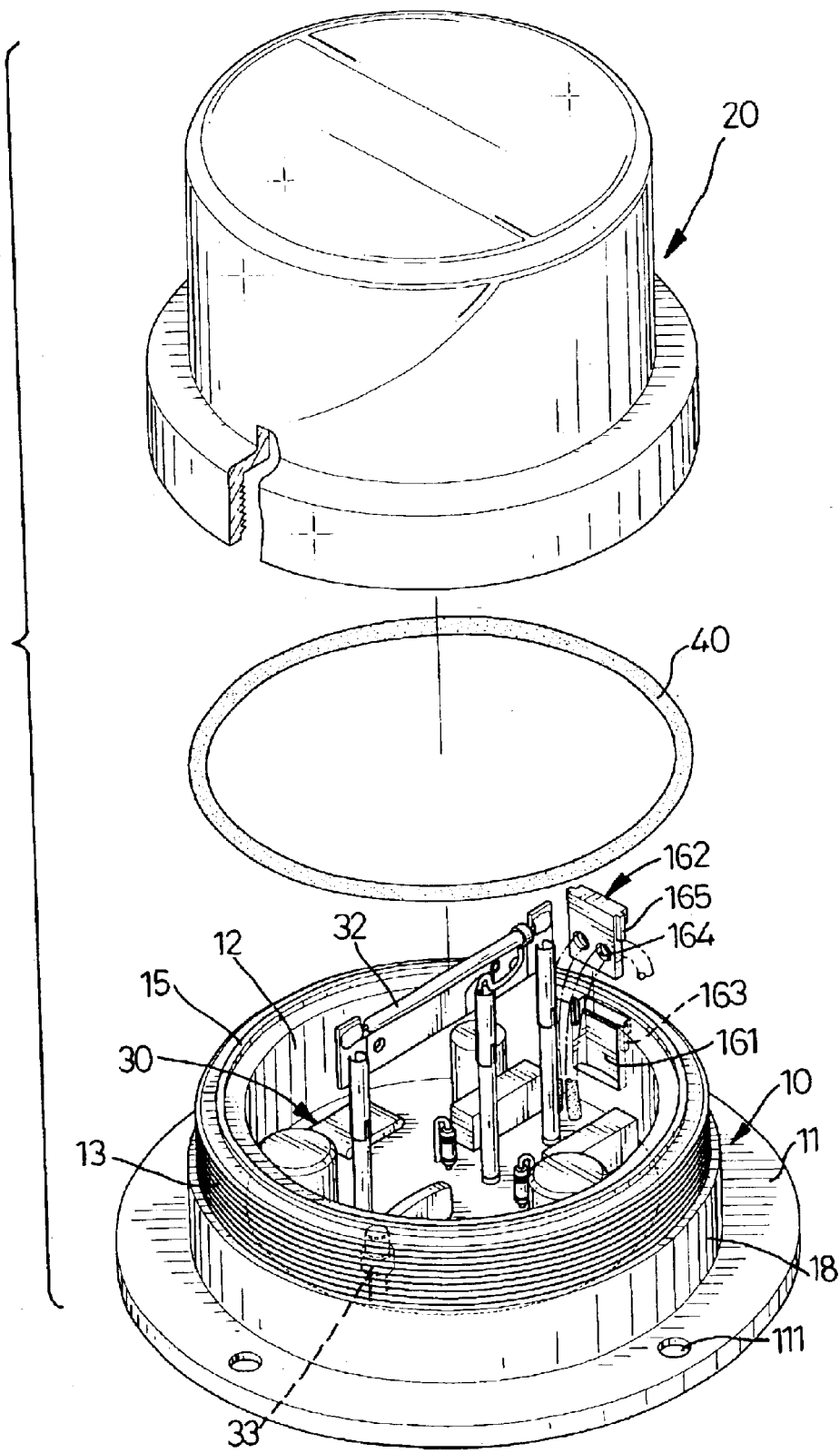
FIG. 1 is an exploded perspective view of a warning light with a mounting base in accordance with the present invention.
Figure 2:
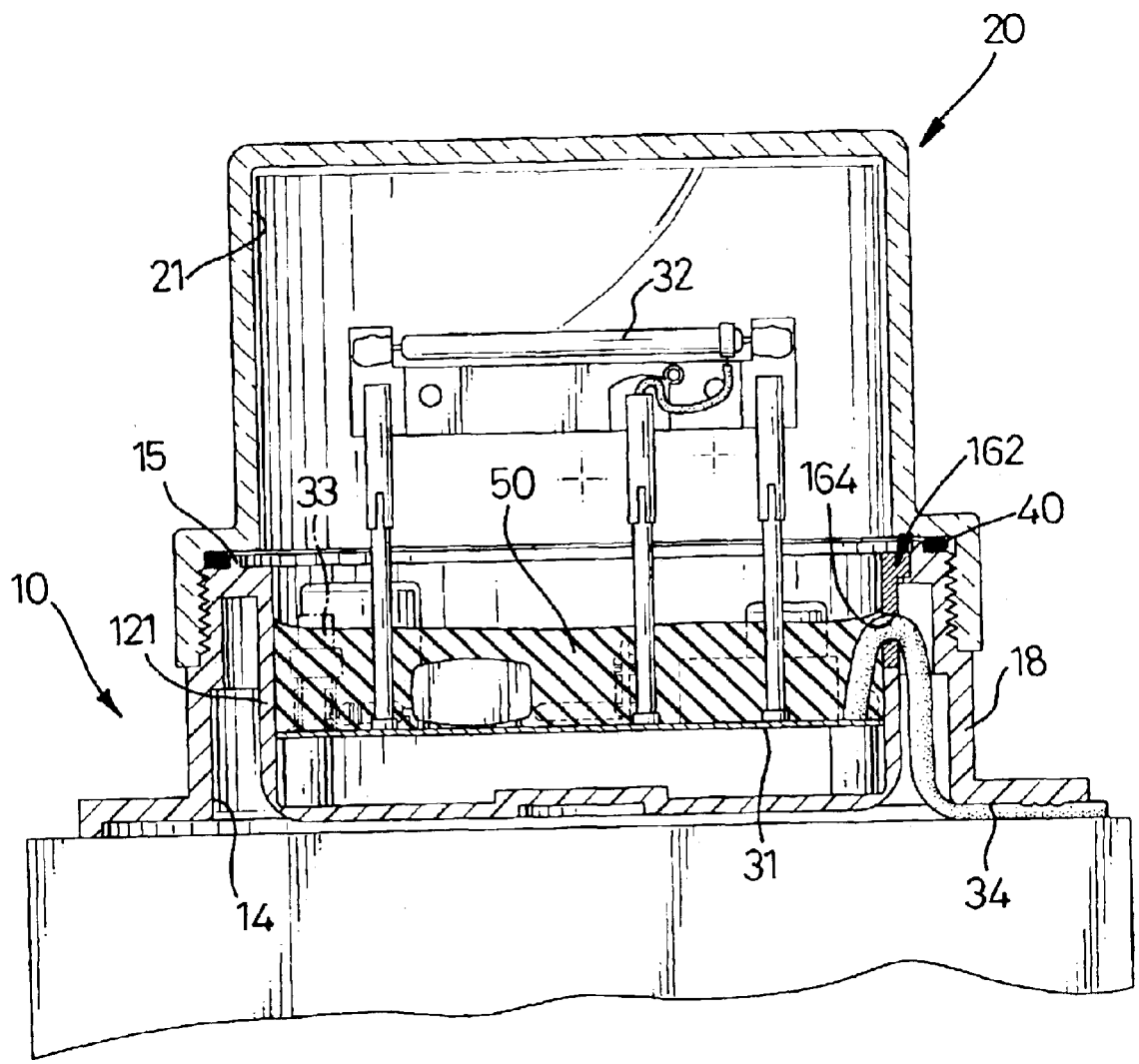
FIG. 2 is a cross sectional plan view of the warning light with a mounting base in FIG. 1.

With reference to FIGS. 1 and 2, a warning light comprises a mounting base (10), a removable casing (20), a light assembly (30), an O-ring (40) and a layer of solidifying substance (50). The light assembly (30) is mounted in the mounting base (10). The removable casing (20) is fitted and attached to the mounting base (10) with the O-ring (40) to form a housing encasing the light assembly (30).

The mounting base (10) in accordance with the present invention has a body (18), an annular mounting lip (11), a recess (12), an exterior thread (13), an annular bottom slot (14) and an annular rib (15). The body (18) has a top (not numbered) and a bottom (not numbered). The annular mounting lip (11) radially protrudes from the bottom of the body (18) of the mounting base (10) and has multiple mounting holes (111) to mount the warning light on a vehicle (not shown) or a stand (not shown) with fasteners (not shown). The recess (12) is defined in the top of the body (18) of the mounting base (10) and has an inner cavity (not numbered), a sidewall (121), an open top (not numbered), a bottom (not numbered) and a wire guide device (not numbered). The wire guide device is mounted on the sidewall (121) of the recess (12) and comprises a notch (161) and a plug (162). The notch (161) is defined through the sidewall (121) of the recess (12) from the top of the body (18) and has two side edges (not numbered) and two positioning slots (163) defined downward at the side edges, respectively.

The plug (162) is tightly fitted into and held in the notch (161) and has wire through holes (164) and two positioning protrusions (165) corresponding to the positioning slots (163) of the notch (161). Length of each of the positioning protrusions (165) is limited and is shorter than the length of the plug (16). The plug (162) is held in position in the notch (161) by means of the positioning protrusions (165) respectively fitted in the positioning slots (163) of the notch (161). Since the length of each of the positioning protrusions (165) is short, the plug (16) will be conveniently fitted into the notch (161). The wire through holes (164) are tapered outward.

The exterior thread (13) is defined around the body (18) and is adjacent to the top of the body (18) of the mounting base (10). The annular bottom slot (14) is defined in the bottom of the body (18) and around the sidewall (121) of the recess (12). Also, the notch (16), which is defined through the sidewall (121) of the recess (12) communicates with the inner cavity of the recess (12) and the annular bottom slot (14) in the mounting base (10). The annular rib (15) is formed on the top of the body (18) and surrounds the recess (12), and will be abutted by the O-ring (40) to keep water out.

The removable casing (20) is conventional and has an inner chamber (21) and an internal thread (not numbered). The removable casing (20) is fitted to and mounted on the mounting base (10) by means of the internal thread threadingly engaging with the exterior thread (13) of the mounting base (10). The O-ring (40) is mounted between the removable casing (20) and the top of the mounting base. (10) to surround the annular rib (15) and is clamped between the mounting base (10) and the casing (20).

The light assembly (30) is attached to the bottom of the recess (12) and has a power control device (31) with multiple electronic elements (not numbered), a light unit (32), an indicator (33) and wires (34). The power control device (31), which is conventional, is secured on the bottom of the recess (12) and contained in the inner cavity of the recess (12). The light unit (32) is electrically connected to the power control device (31) and extends out of the recess (12) through the open top to be received in the inner chamber (21) of the removable casing (20). The light unit (32) is powered and controlled by the power control device (31) to produce a visible warning signal, such as blinking lights.

The indicator (33) is electrically connected to the power control device (31) and is electrically connected to the light unit (32) in parallel. The light assembly (30) might lose its function if the following situations occur: the power control device (31) fails, the light unit (32) breaks down or both. If the indicator (33) is still lit but the light unit (32) is not, it means the light unit (32) has broken down and has to be replaced with a new one. If both the indicator (33) and the light unit (32) are not lit, it means the power control device (31) might have failed. In such a state, the warning light should be exchanged for a new one. The indicator (33) will aid a user who can easily judge what has broken down and determine whether the light unit (32) only or the whole warning light should be replaced.

The wires (34) are electrically connected to the power control device (31) and are adapted to electrically connect the power control device (31) to an outside electricity supply (not shown) that will provide power. Each wire (34) has an inside end (not numbered) and an outside end (not numbered). The inside end is electrically connected to the power control device (31). The outside end passes through one of the wire through holes (164) in the plug (162) and extends outward the mounting base (10) through the annular bottom slot (14). Since the wire through holes (164) are tapered outward, the outside end of the wire (34) easily passes through the wire through hole (164) from inside of the recess (12) and is held in the w ire through hole (164). Moreover, the wires (34) are bent by such a structure of the mounting base (10) so the wires (34) will not be easily pulled outward when the wires (34) are held by the plug (162).

Finally, the solidifying substance (50) is poured into the recess (12) over the power control device (31) without covering the indicator (33). The solidifying substance (50) only covers the leads of the electrical elements and the wire through holes (164). Accordingly, less solidifying substance (50) is needed to achieve the same effects of waterproofing and parts fixing for a warning light with respect to a warning light in accordance with the prior art. Thus, the production cost of the warning light is lower than previously experienced.

Figure 3:
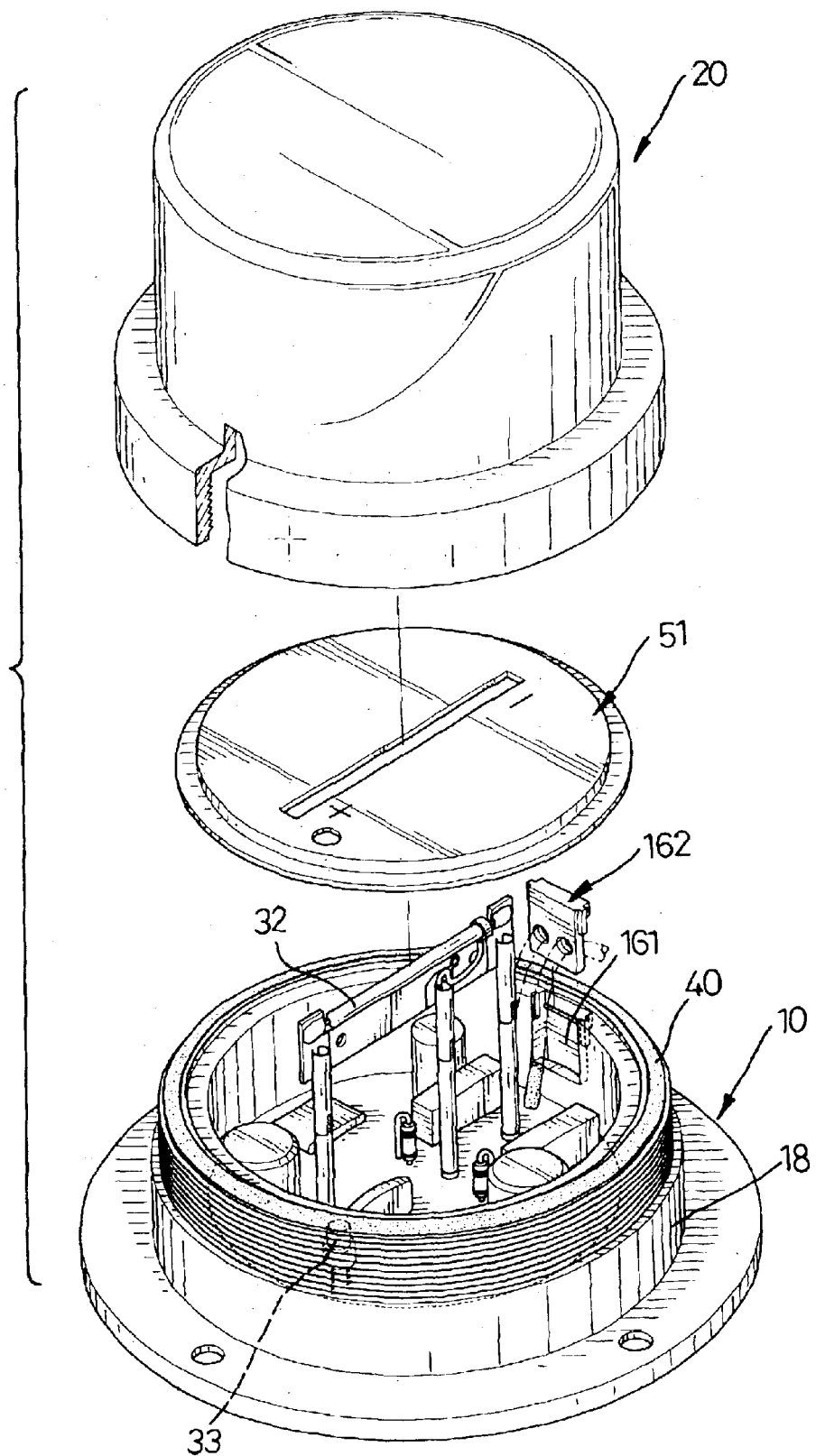
FIG. 3 is an exploded, operational perspective view of an alternative warning light with a mounting base in accordance with the present invention.
Figure 4:
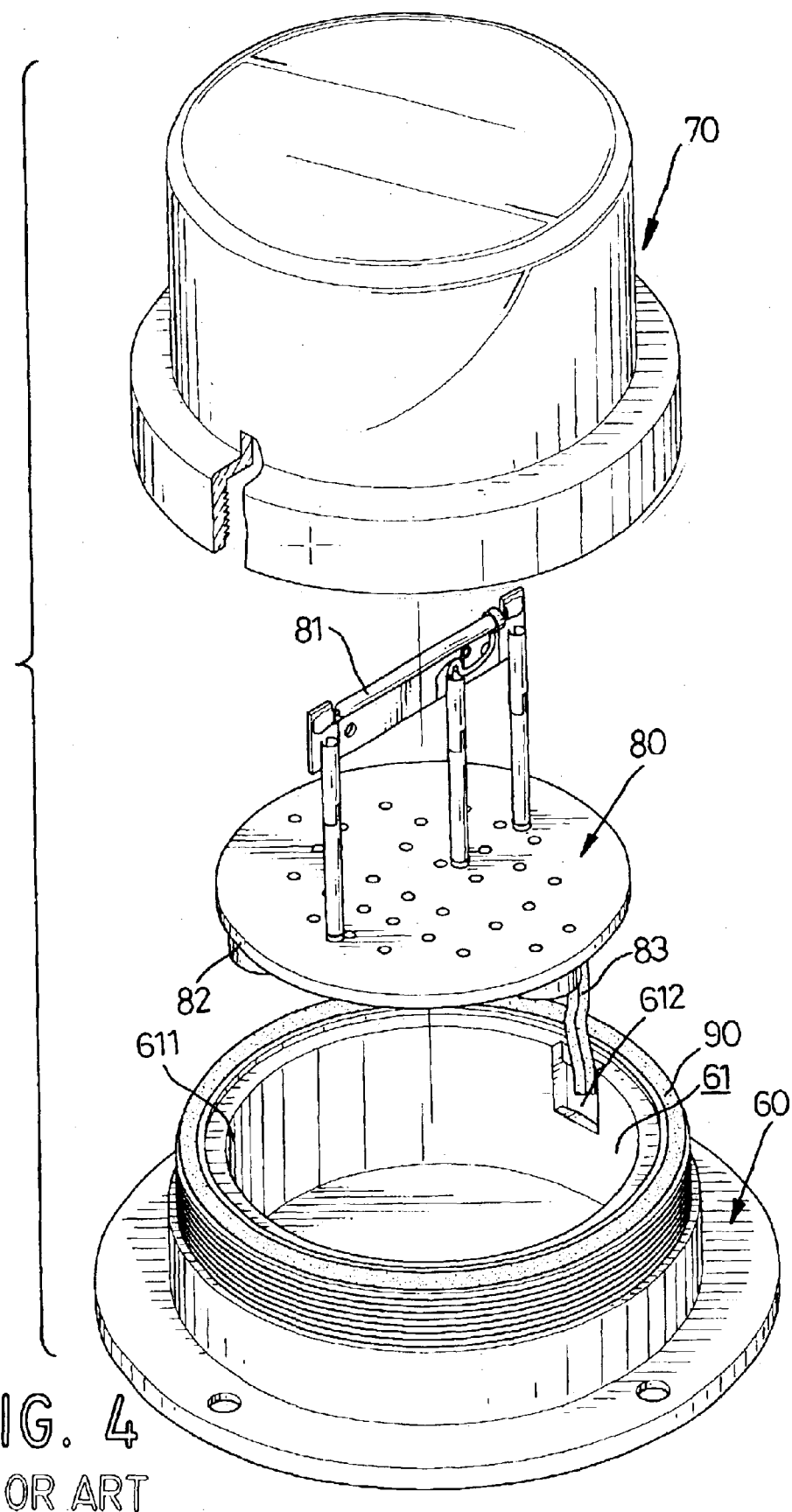
FIG. 4 is an exploded perspective view of a warning light with a conventional wire guide feature.
Figure 5:
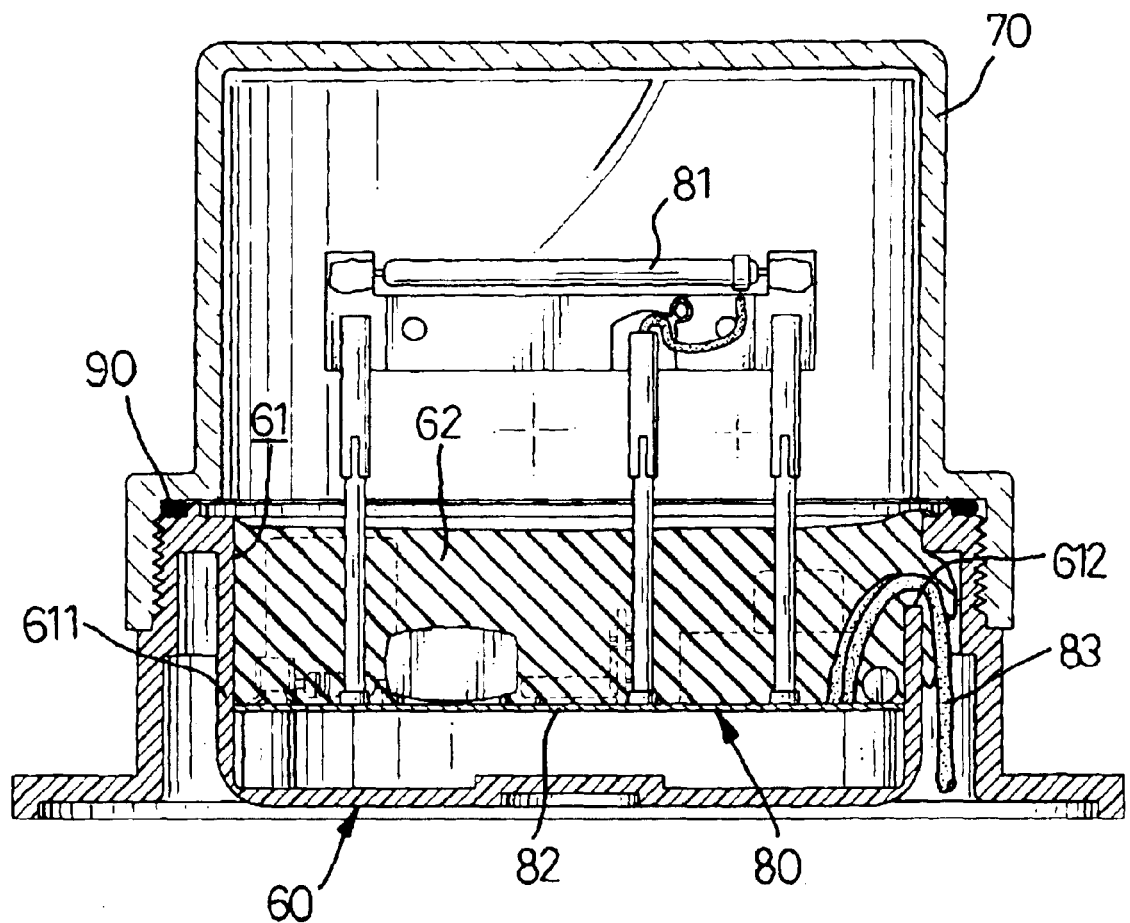
FIG. 5 is a cross sectional plan view of another warning light with a conventional wire guide feature in accordance with the prior art.

With reference to FIG. 3, optionally, the warning light further comprises a reflector (51) that is attached over the now solidifying substance (50). The reflector (51) has an elongated hole (not numbered) and a through hole (not numbered) corresponding to the light unit (32) and the indicator (33), respectively. The light unit (32) passes through and extends out of the elongated hole of the reflector (51). The indicator (33) is held in the through hole in the reflector (51). The reflector (51) will reflect the light produced by the light unit (32). Furthermore, the elongated hole of the reflector (51) will firmly hold the light unit (32) in position.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting base for a warning light, the mounting base having:
   a body having a top and a bottom;
   a recess defined in the top of the body and having an inner cavity, a sidewall, a bottom, an open top and a wire guide device, the wire guide device attached to the sidewall of the recess and the wire guide device comprising:
      a notch defined through the sidewall of the recess in the body and having two side edges, and two positioning slots respectively defined in the two side edges; and
      a plug having two wire through holes securely fitted and held in the notch and two positioning protrusions respectively fitted into the two positioning slots of the notch to hold the plug in the notch; and
   a bottom slot defined in the bottom of the body of the mounting base and communicating with the notch of the wire guide device.

2. The mounting base as claimed in claim 1, wherein each wire through hole in the plug is tapered outward the recess.

3. The mounting base as claimed in claim 2 further comprising an annular rib formed on the top of the body around the recess and adapted to be abutted by an O-ring.

4. The mounting base as claimed in claim 3, wherein an annular mounting lip with multiple mounting holes radially protrudes out from the bottom of the body of the mounting base.

5. The mounting base as claimed in claim 1, wherein each wire through hole in the plug is tapered outward the recess.

6. The mounting base as claimed in claim 5 further comprising an annular rib formed on the top of the body of the mounting base around the recess and adapted to be abutted by an O-ring.

7. The mounting base as claimed in claim 6, wherein an annular mounting lip with multiple mounting holes radially protrudes out from the bottom of the body of the mounting base.

* * * * *